(12) United States Patent
Liu (10) Patent No.: US 8,890,837 B2
(45) Date of Patent: Nov. 18, 2014

(54) LIQUID CRYSTAL DISPLAY HAVING TOUCH SENSING FUNCTIONALITY AND TOUCH SENSING METHOD THEREOF

(75) Inventor: Tzu-Wei Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 664 days.

(21) Appl. No.: 13/092,969

(22) Filed: Apr. 24, 2011

(65) Prior Publication Data

US 2012/0146936 A1 Jun. 14, 2012

(30) Foreign Application Priority Data

Dec. 10, 2010 (TW) ................................. 099143266

(51) Int. Cl.
*G06F 3/045* (2006.01)
*G06F 3/044* (2006.01)
*G06F 3/041* (2006.01)
*G09G 3/36* (2006.01)

(52) U.S. Cl.
CPC .............. *G09G 3/3648* (2013.01); *G06F 3/044* (2013.01); *G06F 3/0412* (2013.01)
USPC .......................................... 345/174; 345/104

(58) Field of Classification Search
CPC ................................ G06F 3/044; G06F 3/0412
USPC ........................................... 345/173, 174, 104
See application file for complete search history.

(56) References Cited

U.S. PATENT DOCUMENTS

| | | | |
|---|---|---|---|
| 2008/0309655 A1* | 12/2008 | Ito ................................. | 345/211 |
| 2009/0101900 A1* | 4/2009 | Chuang et al. .................. | 257/59 |
| 2009/0147118 A1 | 6/2009 | Karim | |
| 2009/0160822 A1* | 6/2009 | Eguchi et al. ................. | 345/174 |
| 2009/0256816 A1* | 10/2009 | Kim ............................... | 345/174 |
| 2010/0079406 A1* | 4/2010 | Chen et al. ..................... | 345/174 |

* cited by examiner

*Primary Examiner* — Chanh Nguyen
*Assistant Examiner* — John Kirkpatrick
(74) *Attorney, Agent, or Firm* — Winston Hsu; Scott Margo (57) ABSTRACT

A liquid crystal display having touch sensing functionality includes a display panel and a sensing unit integrated in the display panel. The display panel has a gate line for delivering a gate signal, a scan line for delivering a scan signal and a readout line for delivering a readout signal. The sensing unit resets a sense voltage according to the low-level voltage of the gate signal. Further, the sensing unit performs a pull-up operation on the sense voltage according to the high-level voltage of the gate signal and performs a boost operation on the sense voltage according to the high-level voltage of the scan signal, for enhancing touch sensitivity. The readout signal is generated by the sensing unit according to the sense voltage and the high-level voltage of the gate signal.

16 Claims, 7 Drawing Sheets

LIQUID CRYSTAL DISPLAY HAVING TOUCH SENSING FUNCTIONALITY AND TOUCH SENSING METHOD THEREOF

CROSS-REFERENCE TO RELATED APPLICATIONS

This application claims the benefit of Taiwan Patent Application No. 099143266, filed Dec. 10, 2010, now Taiwan Patent No. 1407405 and included herein by reference in its entirety.

BACKGROUND

1. Technical Field

The present invention relates to a liquid crystal display, and more particularly, to a liquid crystal display having touch sensing functionality and touch sensing method thereof.

2. Description of the Prior Art

Liquid crystal displays (LCDs) have advantages of a thin profile, low power consumption, and low radiation, and are broadly adopted for application in media players, mobile phones, personal digital assistants (PDAs), computer displays, and flat screen televisions. Utilization of LCDs to perform touch input functions has steadily become the mainstream, making application of touch-sensitive LCDs increasingly widespread. Touch-sensitive LCDs employ touch panels, which includes resistive touch panels and capacitive touch panels. Resistive touch panels locate touch input positions through voltage drops, but are unable to provide multi-touch input functionality. Capacitive touch panels typically include sensing capacitors, and perform signal processing on capacitance variations of the sensing capacitors corresponding to touch points to locate touch input positions.

Figure 1:
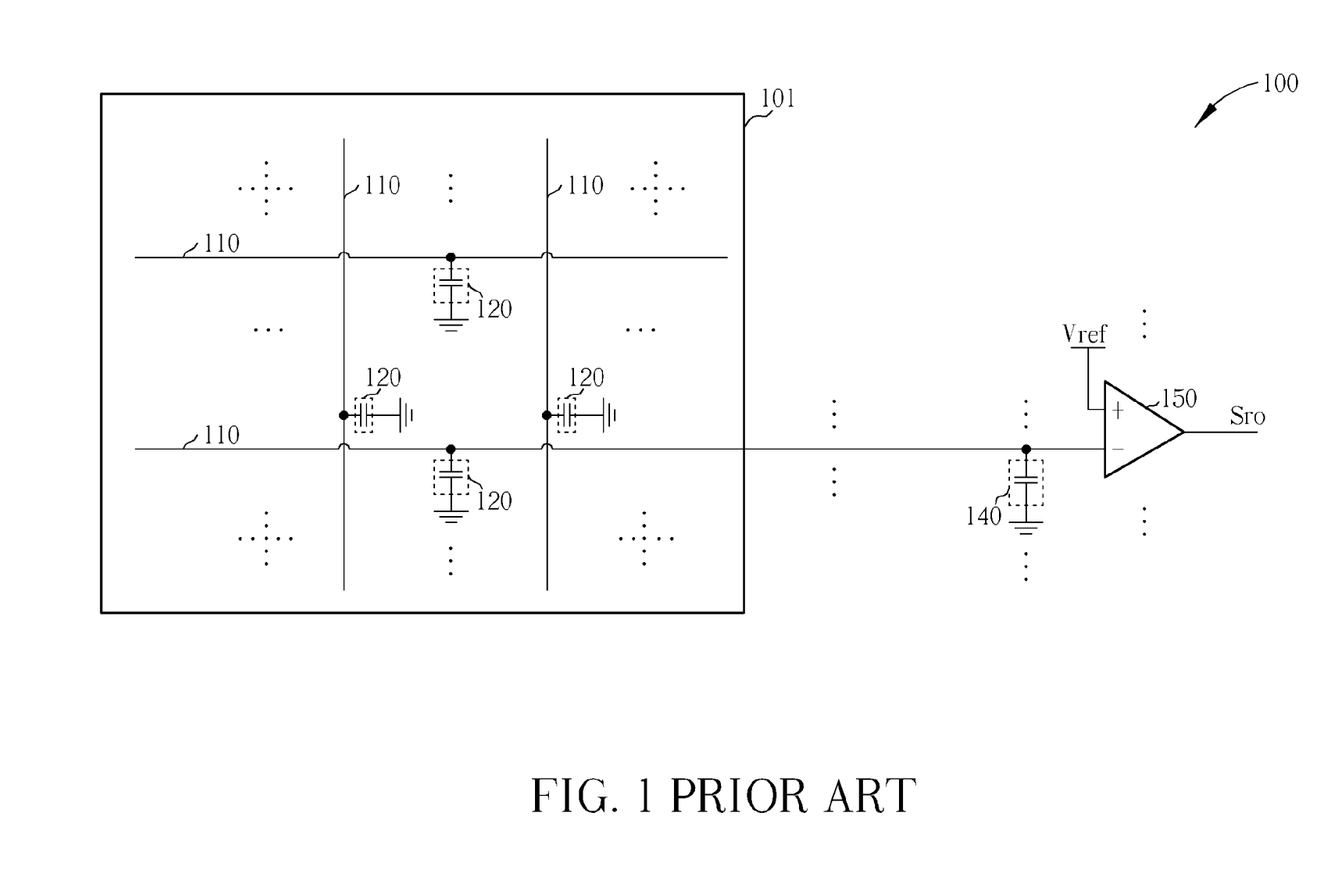
FIG. 1 is a structural diagram schematically showing a prior-art touch panel device.

FIG. 1 is a structural diagram schematically showing a prior-art touch panel device. As shown in FIG. 1, the touch panel device 100 includes a touch panel 101, a plurality of readout lines 110, a plurality of sensing capacitors 120, a plurality of storage capacitors 140, and a plurality of comparators 150. When the touch panel 101 is touched, capacitance of a sensing capacitor 120 corresponding to a touch point changes, causing capacitor voltage thereof to change. The change in capacitor voltage is transmitted to the corresponding storage capacitor 140 through the corresponding readout line 110, and the corresponding comparator 150 compares the capacitor voltage of the storage capacitor 140 with a reference voltage Vref to generate a touch readout signal Sro.

However, as dimensions of the touch panel 101 increase, trace resistance of the readout lines 110 increases, such that the change in capacitor voltage of the sensing capacitor 120 transmitted to the storage capacitor 140 experiences a voltage drop due to the trace resistance, causing reduced touch sensitivity. Further, as parasitic capacitance of the readout lines 110 increases with increased size of the touch panel 101, transmission delay of the capacitor voltage from the sensing capacitor 120 to the storage capacitor 140 also increases, lowering responsiveness of the touch panel 101. Finally, the touch panel 101 that is externally attached to a display cannot meet the requirements of thin profile, low cost displays having touch sensing functionality.

SUMMARY OF EMBODIMENTS

In accordance with an embodiment, a liquid crystal display having touch sensing functionality is provided. The liquid crystal display comprises a scan line for transmitting a scan signal, a gate line for transmitting a gate signal, a sensing unit electrically connected to the scan line and the gate line, and a readout line.

The sensing unit is utilized for providing an analog readout signal according to the scan signal and the gate signal, and comprises a first transistor, a first capacitor, a second capacitor, a voltage boost unit and a second transistor. The first transistor comprises a first end electrically connected to the gate line, a gate end, and a second end electrically connected to the gate end. The first capacitor is electrically connected between the gate line and the second end of the first transistor. The second capacitor comprises a first end electrically connected to the second end of the first transistor, and a second end for receiving a common voltage. The voltage boost unit, electrically connected to the scan line and the second capacitor, is put in use for boosting a primary sense voltage at the first end of the second capacitor to become a secondary sense voltage according to the scan signal. The second transistor comprises a first end electrically connected to the gate line, a gate end electrically connected to the voltage boost unit for receiving the secondary sense voltage, and a second end for outputting the analog readout signal. The readout line, electrically connected to the second end of the second transistor, is utilized for transmitting the analog readout signal. In the operation of the sensing unit, capacitance of the second capacitor changes during a touch event for generating the analog readout signal corresponding to the touch event.

Another embodiment provides a touch sensing method for use in a liquid crystal display having touch sensing functionality. The liquid crystal display includes a scan line for transmitting a scan signal, a gate line for transmitting a gate signal, a sensing unit for providing an analog readout signal according to the scan signal and the gate signal, and a readout line for transmitting the analog readout signal. The touch sensing method comprises: providing the gate signal at a first low-level voltage to the gate line, and providing the scan signal at a second low-level voltage to the scan line during a first interval; the sensing unit resetting a primary sense voltage to the first low-level voltage according to the gate signal during the first interval; providing the gate signal at a first high-level voltage to the gate line, and providing the scan signal at the second low-level voltage to the scan line during a second interval; the sensing unit pulling up the primary sense voltage through performing a capacitive couple operation on the gate signal switching from the first low-level voltage to the first high-level voltage during the second interval, wherein the increase of the primary sense voltage is controlled by a touch event; providing the scan signal at a second high-level voltage to the scan line, and providing the gate signal at the first high-level voltage to the gate line during a third interval; the sensing unit boosting the primary sense voltage to become a secondary sense voltage through performing a capacitive couple operation on the scan signal switching from the second low-level voltage to the second high-level voltage during the third interval; and the sensing unit providing the analog readout signal furnished to the readout line according to the secondary sense voltage and the gate signal at the first high-level voltage during the third interval.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, some embodiments will be described in detail with reference to the accompanying drawings. Here, it is to be noted that the present invention is not limited thereto. Furthermore, the step serial numbers regarding the touch sensing method are not meant thereto limit the operating sequence, and any rearrangement of the operating sequence for achieving same functionality is still within the spirit and scope of the invention.

Figure 2:
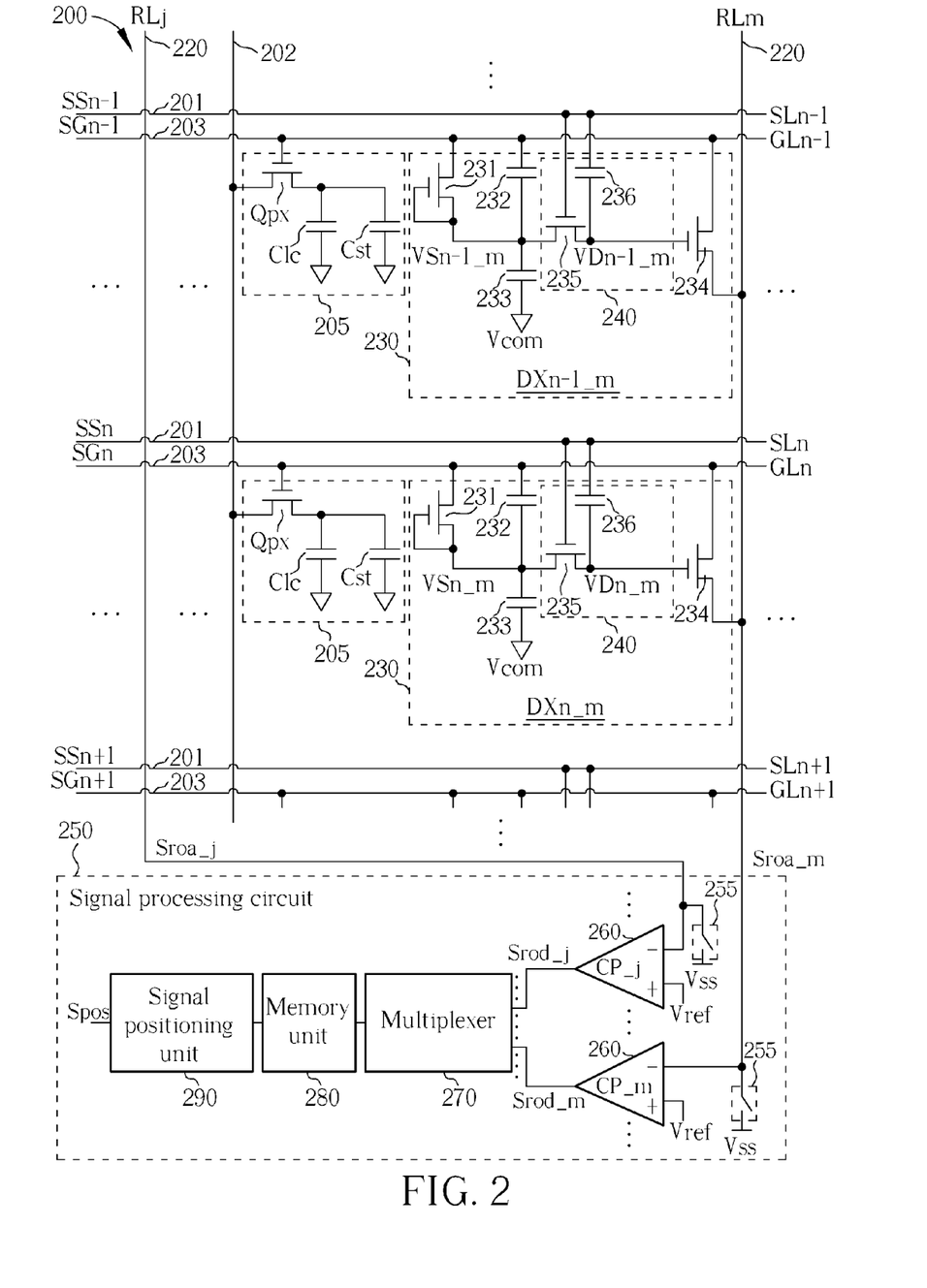
FIG. 2 is a structural diagram schematically showing a liquid crystal display having touch sensing functionality in accordance with a first embodiment.

FIG. 2 is a structural diagram schematically showing a liquid crystal display having touch sensing functionality in accordance with a first embodiment. As shown in FIG. 2, the liquid crystal display 200 comprises a plurality of scan lines 201, a plurality of data lines 202, a plurality of gate lines 203, a plurality of pixel units 205, a plurality of readout lines 220, a plurality of sensing units 230, and a signal processing circuit 250. Each scan line 201 is utilized for transmitting a corresponding scan signal. Each data line 202 is utilized for transmitting a corresponding data signal. Each gate line 203 is utilized for transmitting a corresponding gate signal. Each pixel unit 205 comprises a pixel transistor Qpx, a liquid crystal capacitor Clc, and a storage capacitor Cst. The pixel transistor Qpx may be a thin film transistor or a field effect transistor, and comprises a first end electrically connected to the corresponding data line 202 for receiving the corresponding data signal, a second end electrically connected to the liquid crystal capacitor Clc and the storage capacitor Cst, and a gate end electrically connected to the corresponding gate line 203 for receiving the corresponding gate signal. The pixel transistor Qpx is utilized for providing a control of writing the corresponding data signal according to the corresponding scan signal. The pixel unit 205 outputs a corresponding image signal according to the corresponding data signal written thereto. Each readout line 220, electrically connected to plural sensing units 230, is put in use for transmitting a corresponding analog readout signal.

The signal processing circuit 250 comprises a plurality of switches 255, a plurality of comparators 260, a multiplexer 270, a memory unit 280, and a signal positioning unit 290. Each switch 255, electrically connected to a corresponding readout line 220, is utilized for resetting voltage of a corresponding analog readout signal to a power voltage Vss. Each comparator 260 comprises a positive input end for receiving a reference voltage Vref, a negative input end electrically connected to the corresponding readout line 220 for receiving the corresponding analog readout signal, and an output end for outputting a corresponding digital readout signal generated by comparing the corresponding analog readout signal with the reference voltage Vref. For example, a comparator CP_j, electrically connected to a readout line RLj, is used for comparing an analog readout signal Sroa_j with the reference voltage Vref to generate a digital readout signal Srod_j, and a comparator CP_m, electrically connected to a readout line RLm, is used for comparing an analog readout signal Sroa_m with the reference voltage Vref to generate a digital readout signal Srod_m. In another embodiment, the positive input end of the comparator 260 is electrically connected to the corresponding readout line 220 for receiving the corresponding analog readout signal, and the negative input end of the comparator 260 is utilized for receiving the reference voltage Vref. The multiplexer 270, electrically connected to the comparators 260, is utilized for sequentially outputting the digital readout signals generated by the comparators 260 to the memory unit 280. The memory unit 280, electrically connected to the multiplexer 270, is employed to store the digital readout signals sequentially outputted by the multiplexer 270. The signal positioning unit 290, electrically connected to the memory unit 280, is utilized for generating a touch position signal Spos according to the digital readout signals.

In the embodiment shown in FIG. 2, each pixel unit 205 is adjacent to one sensing unit 230. In another embodiment, the sensing units 230 may be separated by a plurality of gate lines 203 or a plurality of data lines 202, such that not every pixel unit 205 is adjacent to a sensing unit 230. Correspondingly, the scan lines 201 may be separated by a plurality of gate lines 203, or the readout lines 220 may be separated by a plurality of data lines 202. Each sensing unit 230 comprises a first transistor 231, a first capacitor 232, a second capacitor 233, a voltage boost unit 240, and a second transistor 234. The voltage boost unit 240 includes a third transistor 235 and a third capacitor 236. The first transistor 231, the second transistor 234 and the third transistor 235 may each be a thin film transistor (TFT) or a field effect transistor (FET). In the following, sensing unit DXn_m is employed to illustrate interconnections and circuit functions regarding the components in the sensing units 230.

The first transistor 231 comprises a first end electrically connected to the gate line GLn for receiving the gate signal SGn, a gate end, and a second end electrically connected to the gate end. The first capacitor 232 comprises a first end electrically connected to the gate line GLn, and a second end electrically connected to the second end of the first transistor 231. In a preferred embodiment, the second end of the first capacitor 232 is directly coupled to the gate end of the first transistor 231, for reducing circuit layout area. The second capacitor 233 comprises a first end electrically connected to the second end of the first transistor 231, and a second end for receiving a common voltage Vcom. The third transistor 235 comprises a first end electrically connected to the first end of the second capacitor 233, a second end, and a gate end electrically connected to the scan line SLn. The third capacitor 236 comprises a first end electrically connected to the scan line SLn, and a second end electrically connected to the second end of the third transistor 235. The voltage boost unit 240 is capable of boosting a primary sense voltage VSn_m at the first end of the second capacitor 233 to become a secondary sense voltage VDn_m according to the scan signal SSn. The second transistor 234 comprises a first end electrically connected to the gate line GLn, a second end electrically connected to the readout line RLm, and a gate end electrically connected to the second end of the third transistor 235 for receiving the secondary sense voltage VDn_m.

When the gate signal SGn is at a first low-level voltage and the scan signal SSn is at a second low-level voltage, the first transistor 231 is turned on, i.e. in a conductive state, and thereby resets the primary sense voltage VSn_m to the first low-level voltage. Besides, when the first transistor 231 is turned on, the secondary sense voltage VDn_m may be reset to the first low-level voltage through the conduction or leakage current of the third transistor 235. When the gate signal SGn is switched from the first low-level voltage to a first high-level voltage and the scan signal SSn retains the second low-level voltage, the first transistor 231 and the third transistor 235 are turned off, causing the primary sense voltage VSn_m to float, and simultaneously pulling up the primary sense voltage VSn_m through coupling of the first capacitor 232.

It is noted that the capacitance of the second capacitor 233 varies with a touch event, thereby controlling amount of voltage by which the primary sense voltage VSn_m is pulled up. In some embodiments, when a touch event occurs at a panel position corresponding to the sensing unit DXn_m, the capacitance of the second capacitor 233 increases, thereby lowering amount of voltage by which the primary sense voltage VSn_m is pulled up. After the primary sense voltage VSn_m is pulled up, the scan signal SSn is switched from the second low-level voltage to a second high-level voltage for turning on the third transistor 235, which in turn boosts the primary sense voltage VSn_m to become the secondary sense voltage VDn_m through coupling of the third capacitor 236.

In operation of the sensing unit DXn_m, the secondary sense voltage VDn_m is employed to control the operation of the second transistor 234 for providing a control of feeding the first high-level voltage of the gate signal SGn to the readout line RLm so as to set the voltage of the analog readout signal Sroa_m. For that reason, the effectiveness of the secondary sense voltage VDn_m is not reduced by the increased trace resistance of the readout line RLm, and therefore the touch sensitivity of the sensing unit DXn_m is not reduced by the increased trace resistance of the readout line RLm. Further, the sensing units 230 are integrated into the display panel comprising the pixel units 205, giving the liquid crystal display 200 a thinner exterior, and significantly simplifying display structure to bring the cost down.

Figure 3:
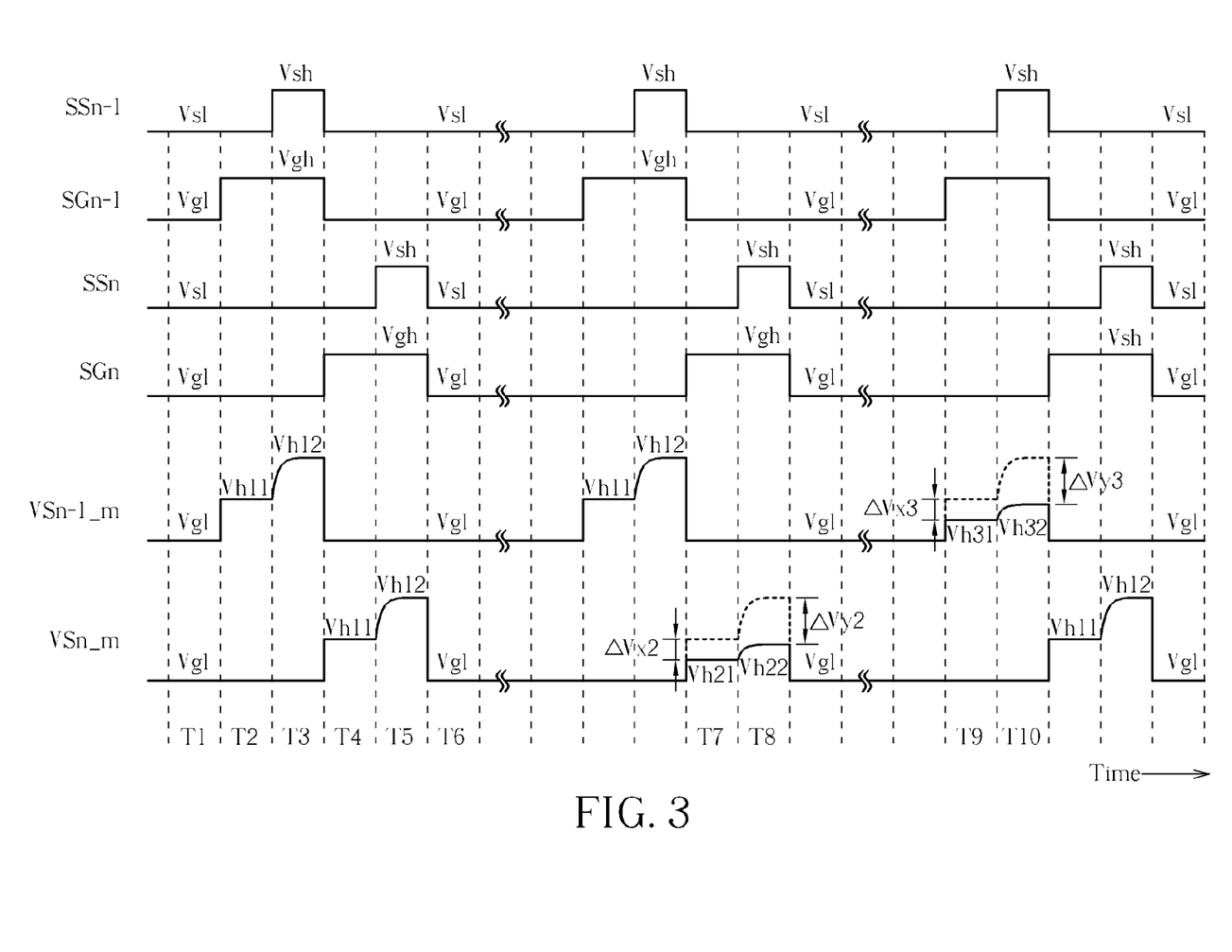
FIG. 3 is a schematic diagram showing related signal waveforms regarding the operation of the touch panel device illustrated in FIG. 2, having time along the abscissa.

FIG. 3 is a schematic diagram showing related signal waveforms regarding the operation of the touch panel device 200 illustrated in FIG. 2, having time along the abscissa. The signal waveforms in FIG. 3, from top to bottom, are the scan signal SSn-1, the gate signal SGn-1, the scan signal SSn, the gate signal SGn, the primary sense voltage VSn-1_*m*, and the primary sense voltage VSn_m. It is noted that the frequency of gate signals is substantially identical to the frequency of scan signals. Referring to FIG. 3 in conjunction with FIG. 2, during an interval T1, the gate signal SGn-1 and the gate signal SGn are both at the first low-level voltage Vgl, and the scan signal SSn-1 and the scan signal SSn are both at the second low-level voltage Vsl. Therefore, the primary sense voltage VSn-1_*m,* the primary sense voltage VSn_m, the secondary sense voltage VDn-1_*m* and the secondary sense voltage VDn_m are all reset to the first low-level voltage Vgl during the interval T1. During an interval T2, the gate signal SGn-1 switches from the first low-level voltage Vgl to the first high-level voltage Vgh, so the sensing unit DXn-1_*m* pulls the primary sense voltage VSn-1_*m* up to a high voltage Vh11 through coupling of its first capacitor 232. During an interval T3, the scan signal SSn-1 switches from the second low-level voltage Vsl to the second high-level voltage Vsh, so the third transistor 235 of the sensing unit DXn-1_*m* is turned on for boosting the primary sense voltage VSn-1_*m* to become the secondary sense voltage VDn-1_*m* through coupling of the third capacitor 236 in the sensing unit DXn-1_*m*. At this time, the primary sense voltage VSn-1_*m* and the secondary sense voltage VDn-1_*m* are both pulled up to a high voltage Vh12. During an interval T4, the gate signal SGn-1 switches from the first high-level voltage Vgh to the first low-level voltage Vgl, and the scan signal SSn-1 switches from the second high-level voltage Vsh to the second low-level voltage Vsl, so the primary sense voltage VSn-1_*m* and the secondary sense voltage VDn-1_*m* are reset to the first low-level voltage Vgl again. Likewise, the gate signal SGn is employed to pull the primary sense voltage VSn_m up to the high voltage Vh11 during the interval T4, the scan signal SSn is employed to boost the primary sense voltage VSn_m to the high voltage Vh12 during an interval T5, and the gate signal SGn is employed to reset the primary sense voltage VSn_m up to the first low-level voltage Vgl during an interval T6. In one embodiment, the first low-level voltage Vgl of the gate signal SGn is greater than the second low-level voltage Vsl of the scan signal SSn, and the first high-level voltage Vgh of the gate signal SGn is greater than the second high-level voltage Vsh of the scan signal SSn.

During an interval T7, the gate signal SGn switches from the first low-level voltage Vgl to the first high-level voltage Vgh. At this time, because a first touch event occurs at a panel position corresponding to sensing unit DXn_m, capacitance of the second capacitor 233 of the sensing unit DXn_m increases, so that the primary sense voltage VSn_m is pulled up to a high voltage Vh21 lower than the high voltage Vh11. During an interval T8, the scan signal SSn switches from the second low-level voltage Vsl to the second high-level voltage Vsh, so the primary sense voltage VSn_m and the secondary sense voltage VDn_m are both pulled up to a high voltage Vh22. Then, the second transistor 234 of the sensing unit DXn_m outputs the analog readout signal Sroa_m corresponding to the first touch event according to the high voltage Vh22, such that the signal processing circuit 250 may employ the analog readout signal Sroa_m to generate the touch position signal Spos corresponding to the first touch event. As shown in FIG. 3, by taking advantage of the voltage boost operation performed by the voltage boost unit 240 of the sensing unit DXn_m, sense voltage difference ΔVx2 corresponding to the first touch event is enlarged to ΔVy2, for enhancing touch sensitivity.

During an interval T9, the gate signal SGn-1 switches from the first low-level voltage Vgl to the first high-level voltage Vgh. At this time, because a second touch event occurs at a panel position corresponding to sensing unit DXn-1_*m,* capacitance of the second capacitor 233 of the sensing unit DXn-1_*m* increases, so that the primary sense voltage VSn-1_*m* is pulled up to a high voltage Vh31 lower than the high voltage Vh11. During an interval T10, the scan signal SSn-1 switches from the second low-level voltage Vsl to the second high-level voltage Vsh, so the primary sense voltage VSn-1_*m* and the secondary sense voltage VDn-1_*m* are both pulled up to a high voltage Vh32. Then, the second transistor 234 of the sensing unit DXn-1_*m* outputs the analog readout signal Sroa_m corresponding to the second touch event according to the high voltage Vh32, such that the signal processing circuit 250 may employ the analog readout signal Sroa_m to generate the touch position signal Spos corresponding to the second touch event. As shown in FIG. 3, by taking advantage of the voltage boost operation performed by the voltage boost unit 240 of the sensing unit DXn-1_*m,* sense voltage difference ΔVx3 corresponding to the second touch event is enlarged to ΔVy3, for enhancing touch sensitivity. It is noted that the voltages furnished to the first and gate ends of each second transistor 234 are ac voltages, which reduces the voltage stress thereof.

Figure 4:
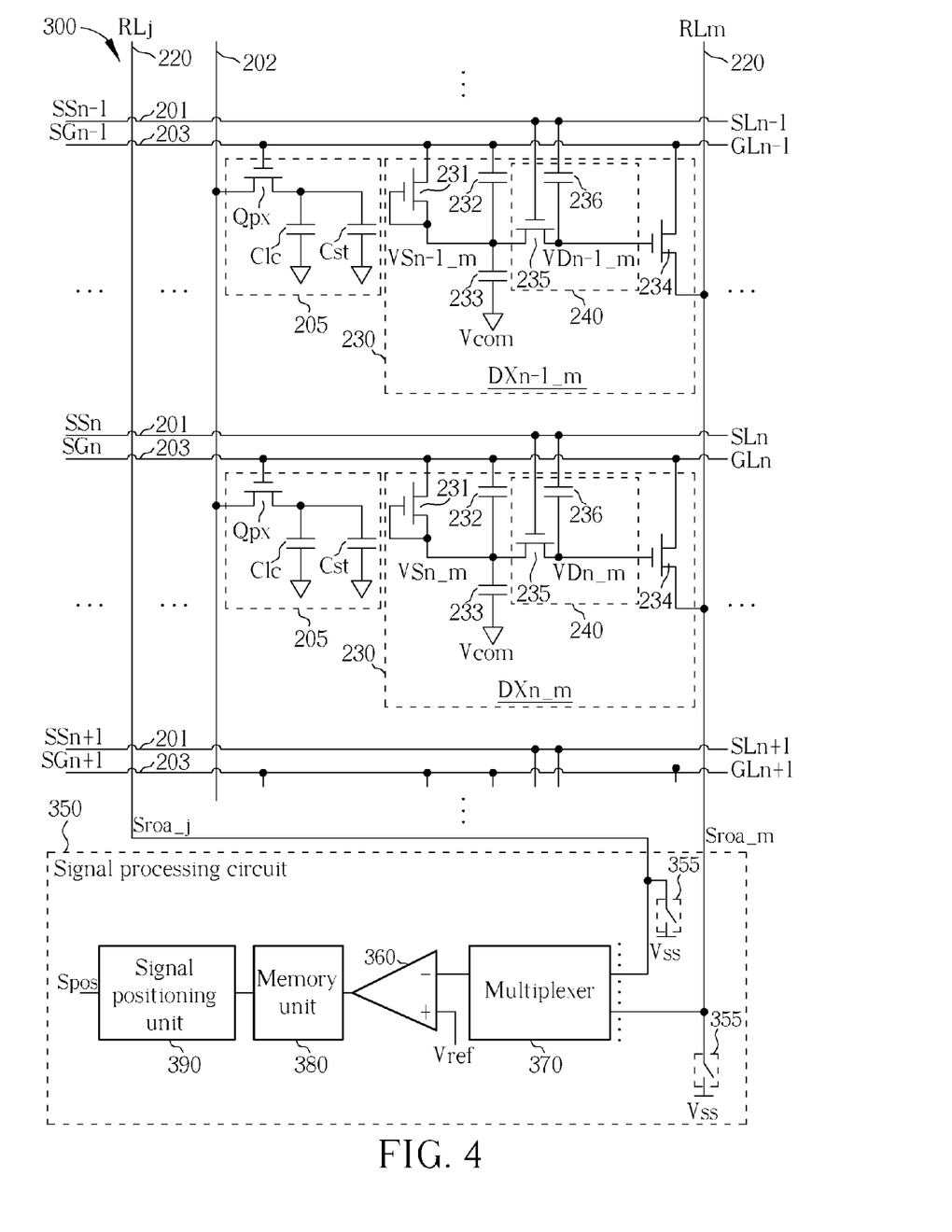
FIG. 4 is a structural diagram schematically showing a liquid crystal display having touch sensing functionality in accordance with a second embodiment.

FIG. 4 is a structural diagram schematically showing a liquid crystal display having touch sensing functionality in accordance with a second embodiment. As shown in FIG. 4, the liquid crystal display 300 is similar to the liquid crystal display 200 shown in FIG. 2, differing in that the signal processing circuit 250 is replaced with a signal processing circuit 350. The signal processing circuit 350 comprises a plurality of switches 355, a multiplexer 370, a comparator 360, a memory unit 380, and a signal positioning unit 390. Each switch 355, electrically connected to a corresponding readout line 220, is utilized for resetting voltage of a corresponding analog readout signal to the power voltage Vss. The multiplexer 370, electrically connected to the readout lines 220, is utilized for sequentially outputting the analog readout signals to the comparator 360. It is noted that the multiplexer 270 shown in FIG. 2 is a digital multiplexer, whereas the multiplexer 370 is an analog multiplexer.

The comparator 360 comprises a positive input end for receiving a reference voltage Vref, a negative input end electrically connected to the multiplexer 370 for sequentially receiving the analog readout signals, and an output end electrically connected to the memory unit 380 for outputting digital readout signals generated by comparing the analog readout signals with the reference voltage Vref. In another embodiment, the positive input end of the comparator 360 is electrically connected to the multiplexer 370 for sequentially receiving the analog readout signals, and the negative input end of the comparator 360 is utilized for receiving the reference voltage Vref. The memory unit 380, electrically connected to the comparator 360, is employed to store the digital readout signals sequentially generated by the comparator 360. The signal positioning unit 390, electrically connected to the memory unit 380, is put in use for generating a touch position signal Spos according to the digital readout signals. Other circuit functions of the liquid crystal display 300 are similar to those of the liquid crystal display 200, and are not described again here.

Figure 5:
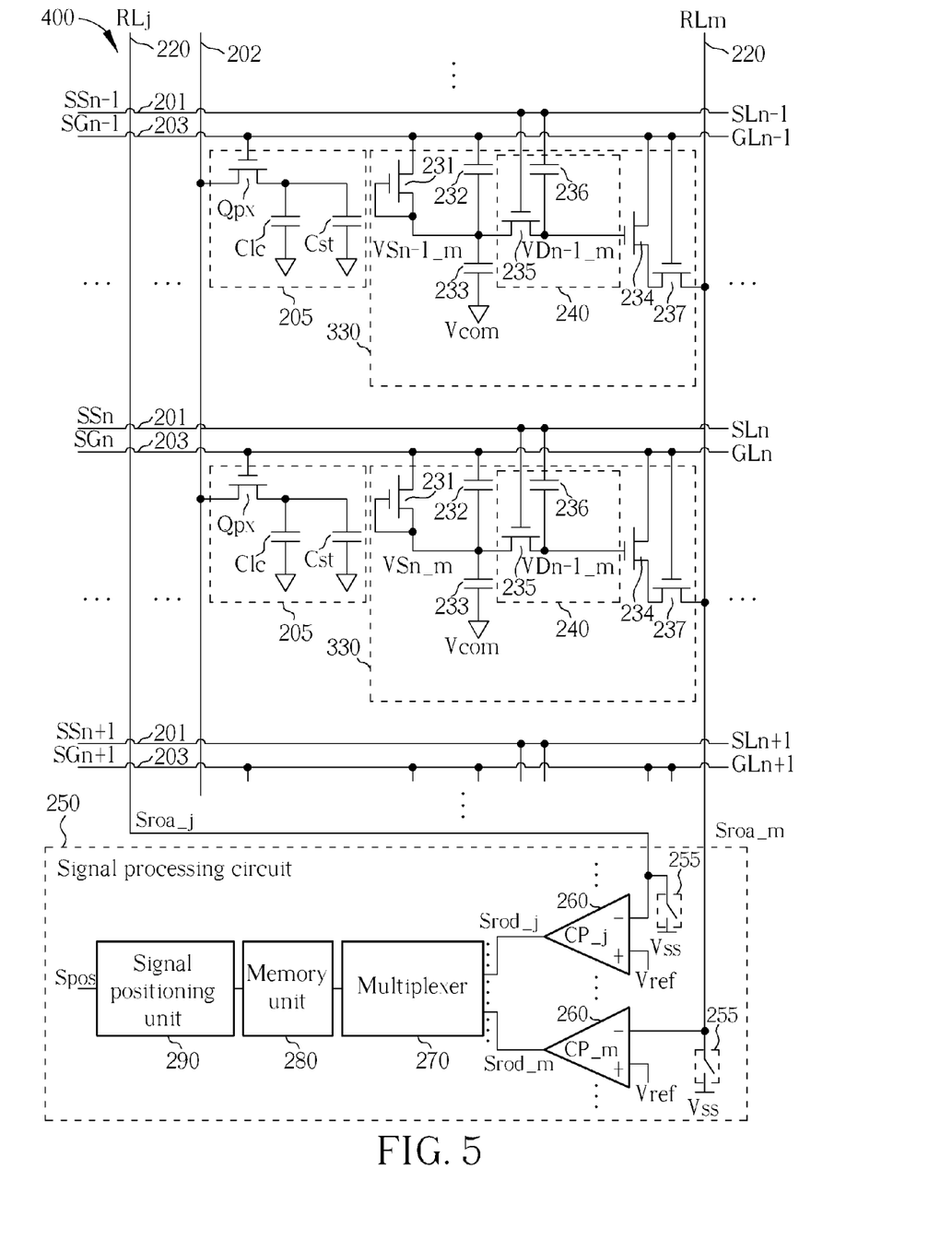
FIG. 5 is a structural diagram schematically showing a liquid crystal display having touch sensing functionality in accordance with a third embodiment.

FIG. 5 is a structural diagram schematically showing a liquid crystal display having touch sensing functionality in accordance with a third embodiment. As shown in FIG. 5, the liquid crystal display 400 is similar to the liquid crystal display 200 shown in FIG. 2, differing primarily in comprising a plurality of sensing units 330 instead of the sensing units 230. Each sensing unit 330 has internal structure similar to that of the sensing unit 230 shown in FIG. 2, differing in that a fourth transistor 237 is further added for providing a control of outputting a corresponding analog readout signal according to a corresponding gate signal.

The fourth transistor 237 comprises a first end electrically connected to the second end of a corresponding second transistor 234, a gate end electrically connected to a corresponding gate line 203 for receiving the corresponding gate signal, and a second end electrically connected to a corresponding readout line 220. The fourth transistor 237 may be a thin film transistor or a field effect transistor. When the corresponding gate signal is at the first low-level voltage, the fourth transistor 237 is turned off to disable output of the corresponding analog readout signal. At this time, the fourth transistor 237 is employed to assist the second transistor 234 in stopping output of the corresponding analog readout signal. When the gate signal is at the first high-level voltage, the fourth transistor 237 is turned on for enabling output of the corresponding analog readout signal. Other circuit functions of the liquid crystal display 400 are similar to those of the liquid crystal display 200, and are not described again here.

Figure 6:
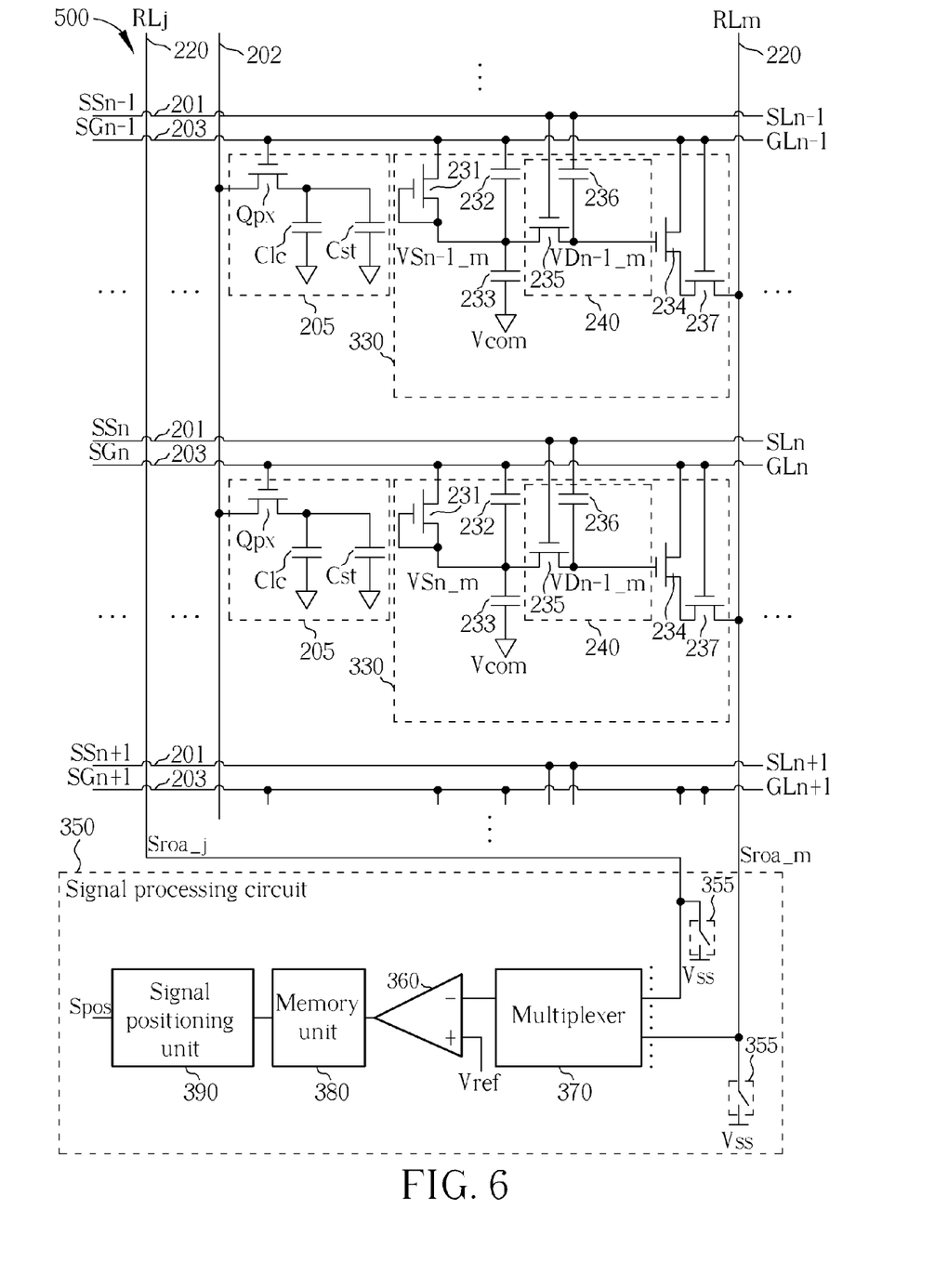
FIG. 6 is a structural diagram schematically showing a liquid crystal display having touch sensing functionality in accordance with a fourth embodiment.

FIG. 6 is a structural diagram schematically showing a liquid crystal display having touch sensing functionality in accordance with a fourth embodiment. As shown in FIG. 6, the liquid crystal display 500 is similar to the liquid crystal display 400 shown in FIG. 5, differing in that the signal processing circuit 250 is replaced with the signal processing circuit 350. The internal structure and functionality of the signal processing circuit 350 are detailed in the above description regarding the liquid crystal display 300, and are not repeated here.

Figure 7:
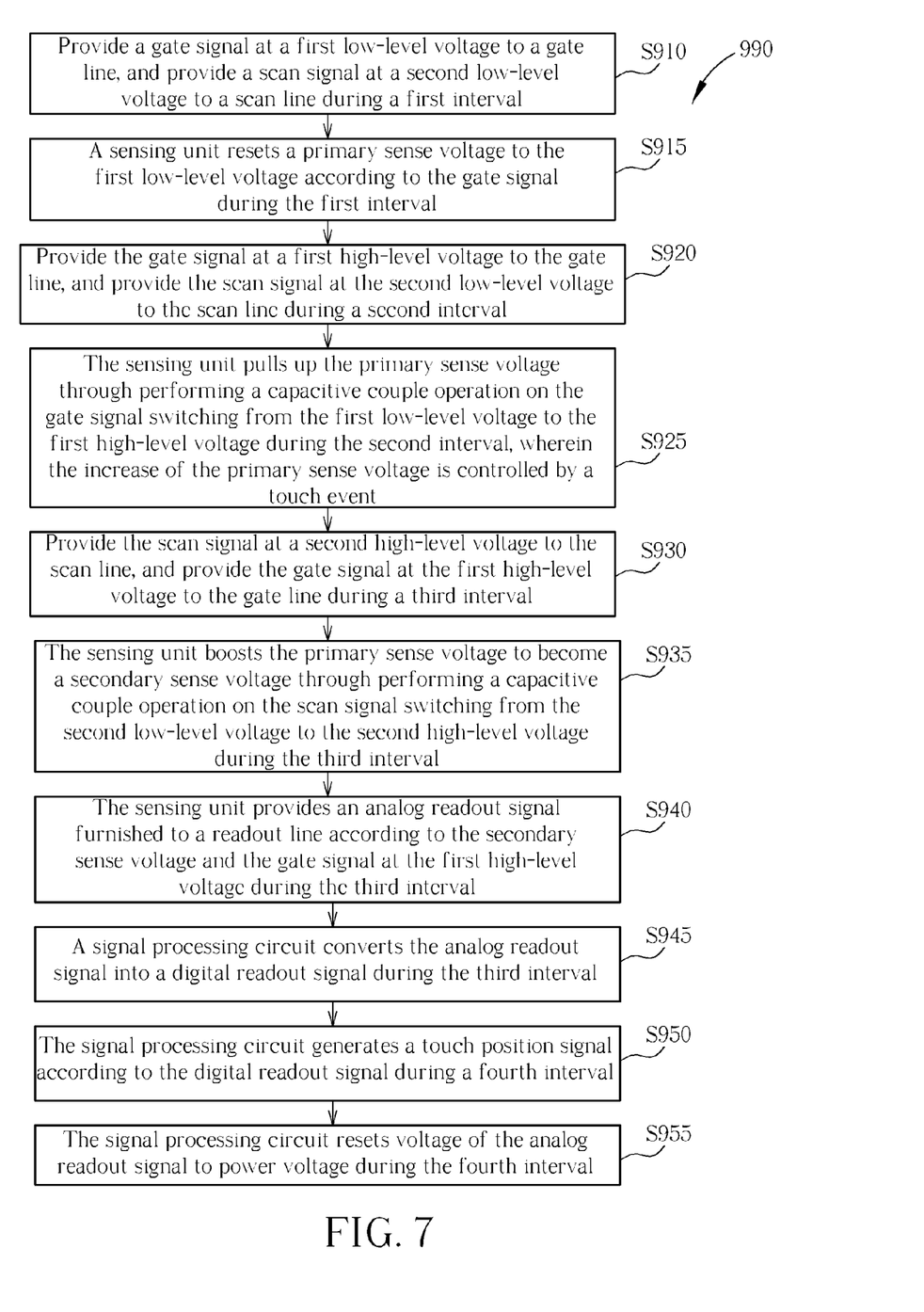
FIG. 7 is a flowchart depicting a touch sensing method according to the present invention.

FIG. 7 is a flowchart depicting a touch sensing method according to the present invention. The touch sensing method of the flow 990 shown in FIG. 7 may be applied to the aforementioned embodiments of the liquid crystal display 200-500. As shown in FIG. 7, the touch sensing method illustrated in the flow 990 comprises the following steps:

Step S910: Provide a gate signal at a first low-level voltage to a gate line, and provide a scan signal at a second low-level voltage to a scan line during a first interval;

Step S915: A sensing unit resets a primary sense voltage to the first low-level voltage according to the gate signal during the first interval;

Step S920: Provide the gate signal at a first high-level voltage to the gate line, and provide the scan signal at the second low-level voltage to the scan line during a second interval;

Step S925: The sensing unit pulls up the primary sense voltage through performing a capacitive couple operation on the gate signal switching from the first low-level voltage to the first high-level voltage during the second interval, wherein the increase of the primary sense voltage is controlled by a touch event;

Step S930: Provide the scan signal at a second high-level voltage to the scan line, and provide the gate signal at the first high-level voltage to the gate line during a third interval;

Step S935: The sensing unit boosts the primary sense voltage to become a secondary sense voltage through performing a capacitive couple operation on the scan signal switching from the second low-level voltage to the second high-level voltage during the third interval;

Step S940: The sensing unit provides an analog readout signal furnished to a readout line according to the secondary sense voltage and the gate signal at the first high-level voltage during the third interval;

Step S945: A signal processing circuit converts the analog readout signal into a digital readout signal during the third interval;

Step S950: The signal processing circuit generates a touch position signal according to the digital readout signal during a fourth interval; and Step S955: The signal processing circuit resets voltage of the analog readout signal to power voltage during the fourth interval.

In the flow 990 of the aforementioned touch sensing method, the sensing unit may disable output of the analog readout signal according to the first low-level voltage of the gate signal during the first interval, and may enable output of the analog readout signal according to the first high-level voltage of the gate signal during the third interval. In one embodiment, the first low-level voltage of the gate signal is greater than the second low-level voltage of the scan signal, and the first high-level voltage of the gate signal is greater than the second high-level voltage of the scan signal.

To sum up, regarding the operation of aforementioned sensing unit in the liquid crystal display according to those embodiments, the sense voltage is employed to control the operation of the second transistor in the sensing unit, thereby providing a control of feeding the first high-level voltage of the gate signal to the readout line so as to set the voltage of the analog readout signal. For that reason, the effectiveness of the sense voltage is not diminished by the increased trace resistance of the readout line, and therefore the touch sensitivity is not lowered by the increased trace resistance of the readout line. Besides, due to the voltage boost operation performed by the voltage boost unit of the sensing unit, sense voltage difference corresponding to a touch event is enlarged, for enhancing touch sensitivity. Further, the sensing units of the liquid crystal display are integrated into the display panel comprising the pixel units, giving the liquid crystal display a thinner exterior, and significantly simplifying display structure to bring the cost down.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display having touch sensing functionality, the liquid crystal display comprising:
   a scan line for transmitting a scan signal;
   a gate line for transmitting a gate signal;
   a sensing unit, electrically connected to the scan line and the gate line, for providing a first analog readout signal according to the scan signal and the gate signal, the sensing unit comprising:
      a first transistor having a first end electrically connected to the gate line, a gate end, and a second end electrically connected to the gate end;
      a first capacitor electrically connected between the gate line and the second end of the first transistor;
      a second capacitor having a first end electrically connected to the second end of the first transistor, and a second end for receiving a common voltage;
      a voltage boost unit, for boosting a primary sense voltage at the first end of the second capacitor to become a secondary sense voltage according to the scan signal, the voltage boost unit comprising a third transistor having a first end electrically connected to the first end of the second capacitor, a gate end electrically connected to the scan line, and a second end electrically connected to the gate end of the second transistor, and the voltage boost unit further comprising a third capacitor electrically connected between the scan line and the second end of the third transistor; and
      a second transistor having a first end directly coupled to the gate line, a gate end electrically connected to the voltage boost unit for receiving the secondary sense voltage, and a second end for outputting the first analog readout signal; and
   a first readout line, electrically connected to the second end of the second transistor, for transmitting the first analog readout signal;
   wherein capacitance of the second capacitor changes during a touch event for generating the first analog readout signal corresponding to the touch event.

2. The liquid crystal display of claim 1, wherein the sensing unit further comprises:
   a fourth transistor having a first end electrically connected to the second end of the second transistor, a gate end electrically connected to the gate line, and a second end electrically connected to the first readout line.

3. The liquid crystal display of claim 1, further comprising:
   a second readout line for transmitting a second analog readout signal;
   a first switch, electrically connected to the first readout line, for resetting the first analog readout signal to a power voltage;
   a second switch, electrically connected to the second readout line, for resetting the second analog readout signal to the power voltage;
   a first comparator, electrically connected to the first readout line, for comparing the first analog readout signal with a reference voltage to generate a first digital readout signal; and
   a second comparator, electrically connected to the second readout line, for comparing the second analog readout signal with the reference voltage to generate a second digital readout signal.

4. The liquid crystal display of claim 3, further comprising:
   a multiplexer, electrically connected to the first comparator and the second comparator, for sequentially outputting the first digital readout signal and the second digital readout signal;
   a memory unit, electrically connected to the multiplexer, for storing the first digital readout signal and the second digital readout signal sequentially outputted by the multiplexer; and
   a signal positioning unit, electrically connected to the memory unit, for generating a touch position signal according to the first and second digital readout signals.

5. The liquid crystal display of claim 1, further comprising:
   a second readout line for transmitting a second analog readout signal;
   a first switch, electrically connected to the first readout line, for resetting the first analog readout signal to a power voltage;
   a second switch, electrically connected to the second readout line, for resetting the second analog readout signal to the power voltage;
   a multiplexer, electrically connected to the first readout line and the second readout line, for sequentially outputting the first analog readout signal and the second analog readout signal; and
   a comparator, electrically connected to the multiplexer, for comparing the first analog readout signal with a reference voltage to generate a first digital readout signal, and for comparing the second analog readout signal with the reference voltage to generate a second digital readout signal.

6. The liquid crystal display of claim 5, further comprising:
   a memory unit, electrically connected to the comparator, for storing the first digital readout signal and the second digital readout signal sequentially generated by the comparator; and
   a signal positioning unit, electrically connected to the memory unit, for generating a touch position signal according to the first and second digital readout signals.

7. The liquid crystal display of claim 1, further comprising:
   a data line for transmitting a data signal; and
   a pixel unit, electrically connected to the gate line and the data line, for outputting an image signal according to the gate signal and the data signal.

8. The display device of claim 7, wherein the pixel unit comprises:
   a pixel transistor having a first end electrically connected to the data line for receiving the data signal, a second end, and a gate end electrically connected to the gate line for receiving the gate signal;

a liquid crystal capacitor electrically connected to the second end of the pixel transistor; and a storage capacitor electrically connected to the second end of the pixel transistor.

9. The display device of claim 1, wherein frequency of the gate signal is substantially identical to frequency of the scan signal.

10. The display device of claim 1, wherein a first high-level voltage of the gate signal is greater than a second high-level voltage of the scan signal.

11. The display device of claim 1, wherein a first low-level voltage of the gate signal is greater than a second low-level voltage of the scan signal.

12. A touch sensing method comprising:
providing a liquid crystal display having touch sensing functionality, the liquid crystal display comprising:
a scan line for transmitting a scan signal;
a gate line for transmitting a gate signal;
a sensing unit for providing an analog readout signal according to the scan signal and the gate signal; and
a readout line for transmitting the analog readout signal;
providing the gate signal at a first low-level voltage to the gate line, and providing the scan signal at a second low-level voltage to the scan line during a first interval;
the sensing unit resetting a primary sense voltage to the first low-level voltage according to the gate signal during the first interval;
providing the gate signal at a first high-level voltage to the gate line, and providing the scan signal at the second low-level voltage to the scan line during a second interval;
the sensing unit pulling up the primary sense voltage through performing a capacitive couple operation on the gate signal switching from the first low-level voltage to the first high-level voltage during the second interval, wherein an increase of the primary sense voltage is controlled by a touch event;
providing the scan signal at a second high-level voltage to the scan line, and providing the gate signal at the first high-level voltage to the gate line during a third interval;
the sensing unit boosting the primary sense voltage to become a secondary sense voltage through performing a capacitive couple operation on the scan signal switching from the second low-level voltage to the second high-level voltage during the third interval; and
the sensing unit providing the analog readout signal furnished to the readout line according to the secondary sense voltage and the gate signal at the first high-level voltage during the third interval.

13. The touch sensing method of claim 12, wherein the first high-level voltage of the gate signal is greater than the second high-level voltage of the scan signal.

14. The touch sensing method of claim 12, wherein the first low-level voltage of the gate signal is greater than the second low-level voltage of the scan signal.

15. The touch sensing method of claim 12, wherein the liquid crystal display further comprises a signal processing circuit, and wherein the touch sensing method further comprises:
the signal processing circuit converting the analog readout signal into a digital readout signal during the third interval;
the signal processing circuit generating a touch position signal according to the digital readout signal during a fourth interval; and
the signal processing circuit resetting voltage of the analog readout signal to a power voltage during the fourth interval.

16. The touch sensing method of claim 12, further comprising:
the sensing unit disabling output of the analog readout signal according to the first low-level voltage of the gate signal during the first interval; and
the sensing unit enabling output of the analog readout signal according to the first high-level voltage of the gate signal during the third interval.

* * * * *